United States Patent
Liang

(10) Patent No.: US 12,001,757 B2
(45) Date of Patent: Jun. 4, 2024

(54) PARAMETER ADJUSTMENT METHOD AND ELECTRONIC DEVICE

(71) Applicant: VIVO MOBILE COMMUNICATION CO., LTD., Dongguan (CN)

(72) Inventor: Lei Liang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 3 days.

(21) Appl. No.: 17/748,000

(22) Filed: May 18, 2022

(65) Prior Publication Data
US 2022/0276830 A1 Sep. 1, 2022

Related U.S. Application Data

(63) Continuation of application No. PCT/CN2020/128720, filed on Nov. 13, 2020.

(30) Foreign Application Priority Data

Nov. 20, 2019 (CN) .......................... 201911143582.8

(51) Int. Cl.
*G06F 3/16* (2006.01)
*G06F 3/023* (2006.01)

(52) U.S. Cl.
CPC .............. *G06F 3/165* (2013.01); *G06F 3/023* (2013.01)

(58) Field of Classification Search
CPC ................................. G06F 3/165; G06F 3/023
See application file for complete search history.

(56) References Cited

U.S. PATENT DOCUMENTS

| | | | |
|---|---|---|---|
| 10,235,858 B1* | 3/2019 | Flippen | G08B 25/016 |
| 2009/0099919 A1* | 4/2009 | Schultheiss | G06Q 10/00 |
| | | | 705/14.1 |
| 2014/0369525 A1* | 12/2014 | Lin | H03G 3/3089 |
| | | | 381/107 |
| 2017/0094215 A1 | 3/2017 | Western | |
| 2018/0167715 A1* | 6/2018 | Graylin | G06F 3/165 |

FOREIGN PATENT DOCUMENTS

| | | |
|---|---|---|
| CN | 104243671 A | 12/2014 |
| CN | 104375627 A | 2/2015 |
| CN | 104484190 A | 4/2015 |
| CN | 105630336 A | 6/2016 |
| CN | 106095378 A | 11/2016 |
| CN | 106227497 A | 12/2016 |

(Continued)

OTHER PUBLICATIONS

International Search Report issued in corresponding International Application No. PCT/CN2020/128720, dated Feb. 20, 2021, 4 pages.

(Continued)

*Primary Examiner* — Kenneth B Lee, Jr.
(74) *Attorney, Agent, or Firm* — IPX PLLC

(57) ABSTRACT

A method for parameter adjustment and an electronic device are provided. The method includes: receiving a first input for a target button by a user; and adjusting, in response to the first input, at least two first output parameters corresponding to the target button, where the at least two first output parameters are output parameters of the electronic device.

18 Claims, 3 Drawing Sheets

(56) References Cited

FOREIGN PATENT DOCUMENTS

| | | |
|---|---|---|
| CN | 111061450 A | 4/2020 |
| TW | 201428542 A | 7/2014 |
| WO | 2014201863 A1 | 12/2014 |
| WO | 2015043466 A1 | 4/2015 |

OTHER PUBLICATIONS

First Office Action issued in related Chinese Application No. 201911143582.8, dated Apr. 16, 2021, 9 pages.
Extended European Search Report issued in related European Application No. 20891402.8, dated Dec. 23, 2022, 10 pages.

* cited by examiner

PARAMETER ADJUSTMENT METHOD AND ELECTRONIC DEVICE

CROSS-REFERENCE TO RELATED APPLICATIONS

This application is a continuation of International Application No. PCT/CN2020/128720, filed Nov. 13, 2020, which claims priority to Chinese Patent Application No. 201911143582.8, filed Nov. 20, 2019. The entire contents of each of the above-referenced applications are expressly incorporated herein by reference.

TECHNICAL FIELD

Embodiments of the present application relate to the field of communications technologies, and in particular to a parameter adjustment method and an electronic device.

BACKGROUND

With the continuous development of terminal technologies, functions of an electronic device are increasingly diversified. For example, a user may adjust an output parameter (such as output volume, display brightness, or a font size) of the electronic device according to actual use requirements, and the user may need to adjust multiple output parameters frequently.

For example, the output parameters are output volume (such as ring volume, media volume, alarm clock volume, and prompt volume). Generally, volume can be controlled by two buttons: a volume up button and a volume down button. Alternatively, the volume can be controlled through a volume control (such as a volume control bar).

However, when the user needs to adjust multiple types of output volume (for example, decrease the ring volume, decrease the media volume, and increase the alarm clock volume), the user needs to set the multiple types of output volume one by one, which is a complex operation, so that it is less easy to adjust the multiple types of output volume. Therefore, it is not easy to adjust the multiple output parameters through the electronic device.

SUMMARY

Embodiments of the present application provide a parameter adjustment method and an electronic device.

According to a first aspect, an embodiment of the present application provides a parameter adjustment method, applied to an electronic device, where the method includes: receiving a first input for a target button by a user; and adjusting, in response to the first input, at least two first output parameters corresponding to the target button, where the at least two first output parameters are output parameters of the electronic device.

According to a second aspect, an embodiment of the present application provides an electronic device, where the electronic device includes a receiving module and a control module. The receiving module is configured to receive a first input for a target button by a user. The control module is configured to adjust, in response to the first input, at least two first output parameters corresponding to the target button, where the at least two first output parameters are output parameters of the electronic device.

According to a third aspect, an embodiment of the present application provides an electronic device, where the electronic device includes a processor, a memory, and a computer program that is stored in the memory and that can be run on the processor, and when the processor executes the computer program, the steps of the parameter adjustment method according to the first aspect are implemented.

According to a fourth aspect, an embodiment of the present application provides a non-transitory computer-readable storage medium, where the computer-readable storage medium stores a computer program, and when a processor executes the computer program, the steps of the parameter adjustment method according to the first aspect are implemented.

In this embodiment of the present application, the first input for the target button by the user can be received; and in response to the first input, the at least two first output parameters corresponding to the target button can be adjusted, where the at least two first output parameters are output parameters of the electronic device. Through this solution, adjustment of multiple output parameters of the electronic device can be triggered by one click, so that a way for the user to adjust the multiple output parameters can be simplified. For example, the at least two first output parameters are multiple types of output volume (for example, ring volume and media volume). In this embodiment of the present application, adjustment of multiple types of volume of the electronic device can be triggered by one click, and there is no need to adjust different types of volume through multiple times of handover, so that a way for the user to adjust the multiple types of volume can be simplified. Therefore, through this embodiment of the present application, the multiple output parameters of the electronic device can be adjusted more easily.

DETAILED DESCRIPTION

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of this application.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of this specification, the terms such as "first" and "second" are used to distinguish between different objects, but are not used to describe a particular sequence of the objects. For example, the first input and the second input are used to distinguish between different inputs, instead of describing a specific order of inputs.

In the embodiments of the present application, the term such as "exemplary" or "for example" is used to represent an example, an instance, or a description, Any embodiment or design solution described as "exemplary" or "for example" in the embodiments of the present application should not be construed as being more preferred or advantageous than other embodiments or design solutions. To be precise, the use of the term such as "exemplary" or "for example" is intended to present a related concept in a specific manner.

In the description of the embodiments of the present application, unless otherwise specified, the meaning of "multiple" means two or more. For example, multiple processing units mean two or more processing units, and multiple elements mean two or more elements.

An electronic device in the embodiments of the present application may be an electronic device with an operating system. The operating system may be an Android operating system, an iOS operating system, or another possible operating system. This is not specifically limited in the embodiments of the present application.

The following uses the Android operating system as an example to describe a software environment to which a parameter adjustment method according to an embodiment of the present application is applied.

Figure 1:
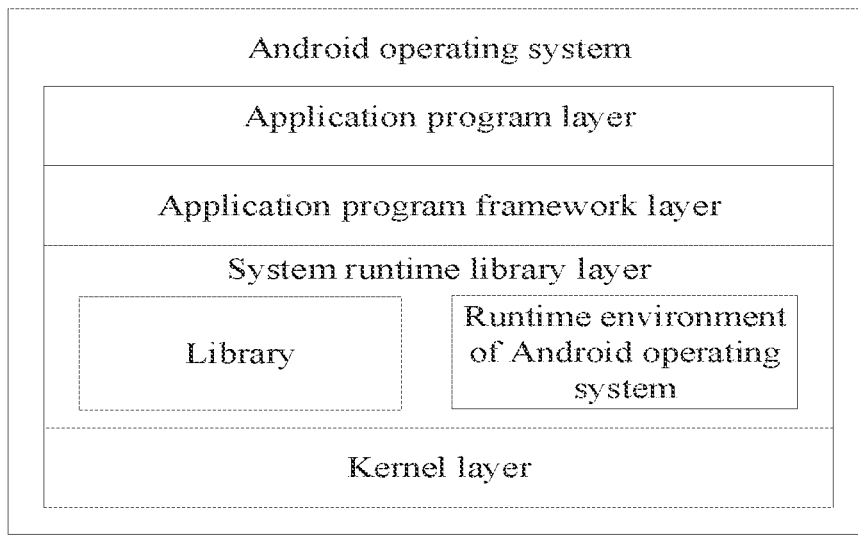
FIG. 1 is a schematic diagram of a possible architecture of an Android operating system according to an embodiment of the present application.

As shown in FIG. 1, it is a schematic diagram of a possible architecture of an Android operating system according to an embodiment of the present application. In FIG. 1, the architecture of the Android operating system includes four layers: an application program layer, an application program framework layer, a system runtime library layer, and a kernel layer (which may be specifically a Linux kernel layer).

The application program layer includes various application programs (including a system application program and a third-party application program) in the Android operating system.

The application program framework layer is an application program framework, and a developer may develop some application programs based on the application program framework layer following a rule for developing the application program framework.

The system runtime library layer includes a library (also referred to as a system library) and a runtime environment of the Android operating system. The library mainly provides various resources required for the Android operating system. The runtime environment of the Android operating system is used to provide the Android operating system with a software environment.

The kernel layer is an operating system layer of the Android operating system, and is a lowest layer of software levels of the Android operating system. The kernel layer provides the Android operating system with a core system service and a hardware-related driver based on the Linux kernel.

Taking the Android operating system as an example, in this embodiment of the present application, a developer can develop and implement, based on the system architecture of the Android operating system as shown in FIG. 1, a software program for developing and implementing the parameter adjustment method according to this embodiment of the present application, so that the parameter adjustment method can be performed based on the Android operating system as shown in FIG. 1. That is, a processor or an electronic device can implement the parameter adjustment method according to this embodiment of the present application by running the software program in the Android operating system.

The electronic device in this embodiment of the present application may be a mobile terminal or a non-mobile terminal. For example, the mobile terminal may be a mobile phone, a tablet computer, a laptop computer, a palmtop computer, an in-vehicle terminal, a wearable device, an ultra-mobile personal computer (UMPC), a netbook, a personal digital assistant (PDA), or the like. The non-mobile terminal may be a personal computer (PC), a television (TV), an automated teller machine, a self-service machine, or the like. This is not specifically limited in this embodiment of the present application.

The parameter adjustment method according to this embodiment of the present application may be performed by the foregoing electronic device, or a functional module and/or functional entity that can implement the parameter adjustment method in the electronic device. Details can be determined according to actual use requirements, which is not limited in this embodiment of the present application. Next, taking the electronic device as an example, the parameter adjustment method according to this embodiment of the present application will be exemplarily described.

Embodiments of the present application provide a parameter adjustment method and an electronic device, so that a first input for a target button by a user can be received; and, in response to the first input, at least two first output parameters corresponding to the target button can be adjusted, where the at least two first output parameters are output parameters of the electronic device. Through this solution, adjustment of multiple output parameters of the electronic device can be triggered by one click, so that a way for the user to adjust the multiple output parameters can be simplified. Taking that the at least two first output parameters are multiple types of output volume (for example, ring volume and media volume) as an example, in this embodiment of the present application, adjustment of multiple types of volume of the electronic device can be triggered by one click, and there is no need to adjust different types of volume through multiple times of handover, so that a way for the user to adjust the multiple types of volume can be simplified. Therefore, through this embodiment of the present application, the multiple output parameters of the electronic device can be adjusted more easily.

Next, the parameter adjustment method according to the embodiments of the present application will be exemplarily described with reference to each drawing.

Figure 2:
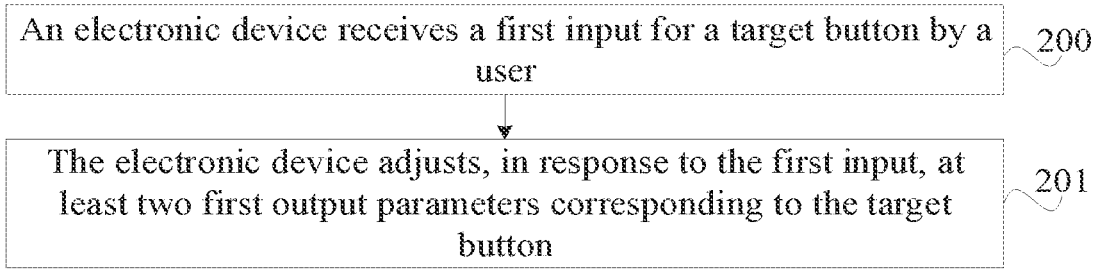
FIG. 2 is a first schematic diagram of a parameter adjustment method according to an embodiment of the present application.

As shown in FIG. 2, an embodiment of the present application provides a parameter adjustment method. The parameter adjustment method may include step 200 and step 201 as follows:

Step 200: An electronic device receives a first input for a target button by a user.

In this embodiment of the present application, the target button may be a physical button or a virtual button, which may be specifically determined according to actual use requirements and are not limited in this embodiment of the present application.

For example, taking that the target button is the physical button as an example, the target button may be a physical volume button (for example, a volume up button or a volume down button) of the electronic device, or the target button may be any other physical button that meets the actual use requirements.

For another example, the target button is the virtual button. The target button may be an existing virtual button in the electronic device or a newly created virtual button in the electronic device.

In this embodiment of the present application, the foregoing first input may be a click input (for example, a single-click input or double-click input) for the target button by the user, a long-press input for the target button by the user, or any other input that meets the actual use requirements, which may be specifically determined according to the actual use requirements and are not limited in this embodiment of the present application.

Step 201: The electronic device adjusts, in response to the first input, at least two first output parameters corresponding to the target button.

The at least two first output parameters may be the output parameters of the electronic device.

In this embodiment of the present application, the electronic device may adjust, in response to the first input, the at least two first output parameters corresponding to the target button, according to a target adjustment way corresponding to the target button.

In this embodiment of the present application, the target button may be configured to trigger adjustment of the at least two first output parameters according to the target adjustment way, (where the target button corresponds to the at least two first output parameters and the target button corresponds to the target adjustment way). Based on this, the user may trigger, by performing an input for the target button, the electronic device to adjust parameter values of the at least two first output parameters in a corresponding adjustment way.

For ease of description, for example, the output parameters are volume, and the parameter adjustment method according to the present application will be exemplarily described below.

The output volume of the electronic device is usually divided into the following types: ring volume, media volume, call volume, alarm volume, and the like. According to the user's habit, the user hopes to be able to quickly and easily set multiple pieces of corresponding volume. For example, the user may need to quickly decrease the media volume and increase the ring volume in a public occasion. For another example, the user may need to, during a rest period, decrease the media volume and the ring volume and increase the alarm volume. That is to say, the user may have the demands of various types of volume combination regulation or adjustment.

However, existing approaches for adjusting multiple types of volume have the following disadvantages. 1) The user needs to manually perform handover between the multiple types of volume before setting volume. That is, the user must select a volume type first and then can adjust the volume. 2) During the handover, the user may sometimes forget to set a certain type of volume. For example, in a quiet conference, a user may have only triggered an operation to decrease the ring volume of an electronic device but forget to trigger an operation to decrease the media volume. In this case, when the user clicks on a video on the electronic device, the volume of video may be loud, which will affect the conference. 3) The user cannot quickly and easily set more than two types of volume simultaneously. 4) The following situation may exist: a physical volume button is invalid due to aging, which makes it difficult to easily set the volume. Therefore, it is necessary to look up a volume setting on a setting interface of the electronic device to set the volume, which is a rather complex operation.

That is to say, at present, there is no fast and easy way to set multiple types of output volume, but the parameter adjustment method according to this embodiment of the present application can resolve the foregoing problem.

Specifically, if the user needs to regulate or adjust the foregoing various volume combinations, the user can perform an input for the target button to trigger the electronic device to adjust, according to a preset relationship, at least two first output parameters. The at least two first output parameters have the preset relationship with the target button.

For example, assuming that the at least two first output parameters are ring volume and media volume respectively, and the target adjustment way is increase of the ring volume and decrease of the media volume, the target button may be configured to trigger adjustment of the ring volume and media volume in a mode of the increase of the ring volume and decrease of the media volume. Specifically, the electronic device may adjust, in response to an input for the target button by the user, the ring volume and media volume according to the target adjustment way corresponding to the target button.

In this embodiment of the present application, the at least two first output parameters may include at least two of the following: the ring volume, the media volume, the alarm volume, call volume, display brightness, a display font, a display font size, and the like. It can be understood that the foregoing output parameters are listed exemplarily, that is, this embodiment of the present application includes but is not limited to the foregoing listed output parameters. In actual implementation, the foregoing at least two first output parameters may further include any other possible output parameter, which can be specifically determined according to actual use requirements and are not limited in this embodiment of the present application.

Specifically, the at least two first output parameters may be any combination of at least two of parameters such as the ring volume, the media volume, the alarm volume, the call volume, the display brightness, the display font, the display font size. Exemplarily, the electronic device may adjust at least two types of output volume in response to the first input. Alternatively, the electronic device may adjust the display brightness, the display font, and the display font size in response to the first input. It can be understood that a combination mode of the foregoing at least two first output parameters is only listed exemplarily, and the combination mode of the at least two first output parameters may be specifically determined according to the actual use requirements and are not limited in this embodiment of the present application.

It should be noted that, for the convenience of description and understanding, for example, the at least two first output parameters are at least two types of output volume as follows, that is, the at least two types of output volume are adjusted for exemplary description.

In this embodiment of the present application, adjusting at least two first output parameters corresponding to the target button in step 201 may be specifically implemented by step 201*a*, step 201*b*, or step 201*c* as follows.

Step 201*a*: The electronic device controls all numerical values of the at least two first output parameters to increase.

Step 201*b*: The electronic device controls all the numerical values of the at least two first output parameters to decrease.

Step 201*c*: The electronic device controls a numerical value of output parameter 1 to increase and a numerical value of output parameter 2 to decrease. Output parameter 1 is at least one output parameter of the at least two first output parameters, and output parameter 2 is an output parameter of the at least two first output parameters except output parameter 1.

In this embodiment of the present application, the electronic device, in response to a user input and is according to a target adjustment method corresponding to a target button, may control all the numerical values of the at least two first output parameters to increase or decrease, or control some of the numerical values of the at least two first output parameters to increase and the rest thereof to decrease, which may be specifically determined according to user settings and are not limited in this embodiment of the present application.

For example, assuming that the target button is configured to trigger adjustment of the ring volume and the media volume (that is, the at least two first output parameters) according to a way of increasing the ring volume and decreasing the media volume (that is, the target adjustment way), the electronic device can control, in response to a user's input for the target button according to the target adjustment way corresponding to the target button, the ring volume to increase and the media volume to decrease. Therefore, the user may trigger, by one click, adjustment of multiple types of output volume of the electronic device, so that multiple output parameters of the electronic device can be adjusted more easily.

In this embodiment of the present application, adjusting at least two first output parameters corresponding to the target button in step 201 may be specifically implemented by step 201*d*.

Step 201*d*: The electronic device adjusts a numerical value of each of the at least two first output parameters from an original value to a target value.

In a first aspect, in this embodiment of the present application, the target value may be a first preset value. The first preset value may be a minimum value (for example, a minimum volume value, that is, silence, which may be expressed by 0%), or a maximum value (a maximum volume value, which may be expressed by 100%), or any numerical value between the minimum value and the maximum value. The first preset value may be specifically determined according to the actual use requirements, which is not limited in this embodiment of the present application.

For example, assuming that the first preset value is 100%, and the target button is configured to trigger adjustment of the ring volume and media volume (that is, the at least two first output parameters) in a way of increasing the ring volume and media volume (that is, a target adjustment way), the electronic device can adjust, in response to a user's input for the target button, numerical values of the ring volume and media volume to the maximum volume values in the target adjustment way corresponding to the target button.

In another aspect, in this embodiment of the present application, the target value may be a sum of a current value (an original value) of the at least two first output parameters and a second preset value (that is, a stepping value). In this case, the electronic device can control, according to a volume stepping adjustment way, the numerical values of the at least two first output parameters to increase (for example, control the at least two first output parameters to increase by the second preset values from the current numerical values) or the numerical values of the at least two first output parameters to decrease (for example, control the at least two first output parameters to decrease by the second preset values from the current numerical values).

Through this solution, the user can trigger, by one click, adjustment of multiple types of output volume of the electronic device to target values, so that the multiple output parameters of the electronic device can be adjusted more easily.

Further, in this embodiment of the present application, after the foregoing step 201*d*, the parameter adjustment method according to this embodiment of the present application may further include step 201*e* and step 201*f* as follows.

Step 201*e*: The electronic device receives a second input for the target button by the user.

Step 201*f*: The electronic device restores, in response to the second input, a numerical value of each of the at least two first output parameters from a target value to an original value.

Through this solution, after the user triggers, by one click, adjustment multiple types of output volume of the electronic device to target values, the user can further trigger, by one click, restoration of the multiple types of output volume of the electronic device to original values, so that multiple output parameters of the electronic device can be adjusted more easily.

In the parameter adjustment method according to this embodiment of the present application, the first input for the target button by the user can be received; and, in response to the first input, the at least two first output parameters corresponding to the target button can be adjusted, where the at least two first output parameters are output parameters of the electronic device. Through this solution, adjustment of multiple output parameters of the electronic device can be triggered by one click, so that a way for the user to adjust the multiple output parameters can be simplified. For example, the at least two first output parameters are two types of output volume (for example, ring volume and media volume). In this embodiment of the present application, adjustment of multiple types of volume of the electronic device can be triggered by one click, and there is no need to adjust different types of volume through multiple times of handover, so that a way for the user to adjust the multiple types of volume can be simplified. Therefore, through this embodiment of the present application, multiple output parameters of the electronic device can be adjusted more easily.

Figure 3:
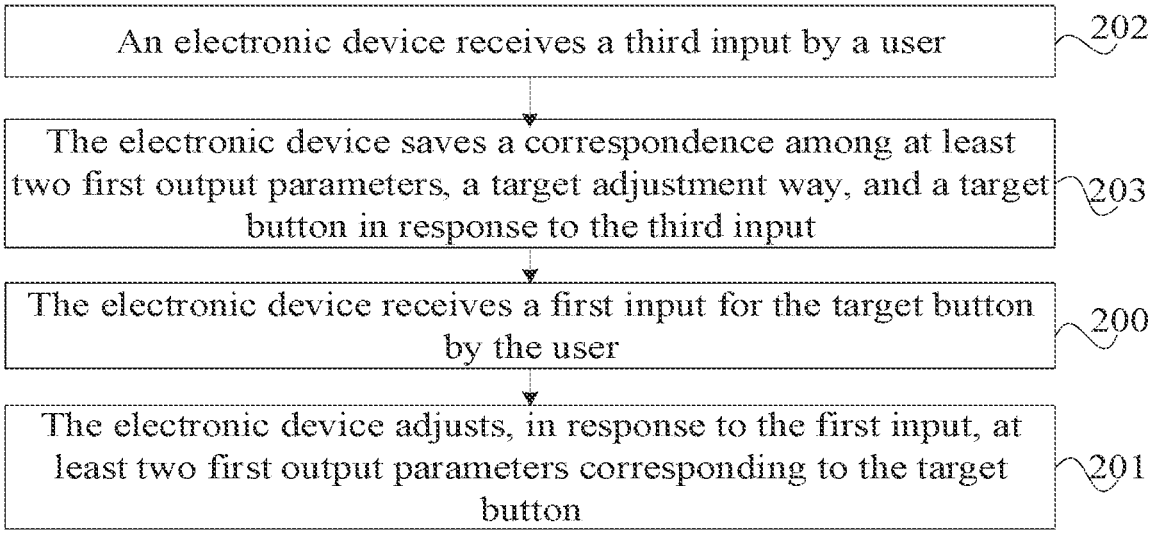
FIG. 3 is a second schematic diagram of the parameter adjustment method according to an embodiment of the present application.

With reference to FIG. 2, as shown in FIG. 3, before step 200, the parameter adjustment method according to an embodiment of the present application may further include step 202 and step 203 as follows.

Step 202: An electronic device receives a third input by a user.

In this embodiment of the present application, the foregoing parameter setting interface may be an interface for setting an output parameter of the electronic device, such as a volume setting interface, a font setting interface, or a volume and font setting interface, which can be specifically determined according to actual use requirements and is not limited in this embodiment of the present application.

In this embodiment of the present application, the foregoing second input may be a user's input (for example, a single-click input or double-click input) on the parameter setting interface, or any other input that meets the actual use requirements.

Step 203: The electronic device saves a correspondence among at least two first output parameters, a target adjustment way, and a target button in response to the third input.

In this embodiment of the present application, for example, multiple types of output volume are adjusted. The user can set a commonly used volume combination adjustment way on the volume setting interface according to actual use requirements, and select a corresponding button (that is, the target button) for triggering adjustment of multiple types of volume. Correspondingly, the electronic device may save a correspondence among at least two volume types, the target adjustment way, and the target button in response to the user's input. The following exemplarily describes an example of setting the correspondence for the multiple types of volume.

Assuming that output volume of the electronic device is divided into three types: ring volume, media volume, and alarm volume, that is, the at least two first output parameters may be any two of the ring volume, media volume, and alarm volume. The following Table 1, Table 2, Table 3, and Table 4 show correspondences between the at least two types of output volume and adjustment ways (i.e. increase or decrease), respectively.

TABLE 1

| Volume type | Adjustment way | | | |
|---|---|---|---|---|
| Media volume | Increase | Increase | Decrease | Decrease |
| Ring volume | Increase | Decrease | Increase | Decrease |

TABLE 2

| Volume type | Adjustment way | | | |
|---|---|---|---|---|
| Media volume | Increase | Increase | Decrease | Decrease |
| Alarm volume | Increase | Decrease | Increase | Decrease |

TABLE 3

| Volume type | Adjustment way | | | |
|---|---|---|---|---|
| Ring volume | Increase | Increase | Decrease | Decrease |
| Alarm volume | increase | Decrease | Increase | Decrease |

TABLE 4

| Volume type | Adjustment way | | | | | | | |
|---|---|---|---|---|---|---|---|---|
| Ring volume | Increase | Increase | Increase | Increase | Decrease | Decrease | Decrease | Decrease |
| Alarm volume | Increase | Increase | Decrease | Decrease | Increase | Increase | Decrease | Decrease |
| Media volume | Increase | Decrease | Increase | Decrease | Increase | Decrease | Increase | Decrease |

Referring to the foregoing Table 1, Table 2. Table 3, and Table 4, it can be known that:

(1) There are four combinations of volume types: (the media volume and ring volume), (the media volume and alarm volume), (the ring volume and alarm volume) and (the ring volume, alarm volume, and media volume).

(2) There are four adjustment ways corresponding to two types of the volume combinations: (increase and increase), (increase and decrease), (decrease and increase), and (decrease and decrease).

(3) There are eight adjustment ways corresponding to three types of the volume combinations: (increase, increase, and increase), (increase, increase, and decrease) . . . (decrease, decrease, and decrease).

It can be understood that because there are many combination options composed of volume types and volume adjustment ways, it is unrealistic for the user to set each type of volume. The user can set a volume combination adjustment way according to a commonly used scene by itself, such as decreasing the media volume and ring volume by one click, decreasing the medium volume and increasing the ring volume by one click, or the like. The user can set different volume combinations according to its habit to meet different daily demands.

In this embodiment of the present application, in the volume setting interface of the electronic device, a field for setting quick adjustment of multiple types of volume may increase, so that the user can choose different volume combinations and set a target button (which can be called a shortcut key) for triggering adjustment of the multiple types of volume. The shortcut key may be set by default in a system or user-defined (for example, the shortcut key is selected from an existing shortcut key option, or a current shortcut key option is modified).

Table 5 and Table 6 exemplarily show shortcut keys corresponding to two types of volume adjustment ways.

TABLE 5

| Volume type | Adjustment way | Shortcut key |
|---|---|---|
| Media volume | Increase | Continuously press a volume up button twice |
| Ring volume | Increase | |

TABLE 6

| Volume type | Adjustment way | Shortcut key |
|---|---|---|
| Media volume | Increase | Long press dial key 1 |
| Alarm volume | Decrease | |

After the user sets at least two types of the volume, the adjustment way, and the shortcut key, each time the user needs to adjust the multiple types of volume, the user may directly use the shortcut key to trigger, by one click, the electronic device to adjust the multiple types of volume, which is simple and easy.

Based on the foregoing Table 5, if the user continuously presses the volume up button (that is, an entity button) twice, the electronic device may be triggered by one click to control increase of the media volume and increase of the ring volume.

Based on the foregoing Table 6, if the user long presses dial key 1 (that is, a virtual key), the electronic device may be triggered by one click to control increase of the media volume and decrease of the alarm volume.

It should be noted that settings of the at least two types of volume, adjustment way, and shortcut key are exemplary descriptions. It can be understood that settings in this embodiment of the present application is not limited to the foregoing settings, and may further include any other possible settings, which can be determined according to actual use requirements and is not limited in this embodiment of the present application.

In this embodiment of the present application, multiple types of volume may be adjusted by one click, so that a way for the user to adjust the multiple types of volume can be simplified, and there is no need to adjust different types of volume through multiple types of handover. Moreover, by adjusting the multiple types of volume by one click, it can be prevented, in a special scene, that only a volume is adjusted but another type of volume is forgotten.

In this embodiment of the present application, the at least two first output parameters may be at least two types of output volume. A physical volume button in the electronic device may include a first button, a second button, and a third button. The first button is configured to trigger an increase of output volume, the second button is configured to trigger a decrease of the output volume, and the third button is configured to trigger adjustment of the at least two types of output volume. The target button may be the third button.

For example, the electronic device is a mobile phone. Based on design of a physical volume button of an existing mobile phone, in this embodiment of the present application, the physical volume button of the mobile phone may be split into three parts, such as a volume up button, a volume middle button, and a volume down button. Original functions of the volume up button and the volume down button may be kept, that is, the volume up button is configured to trigger an increase of volume in a current mode, and the volume down button is configured to trigger a decrease of the volume in the current mode. Different from an existing physical volume button, the volume middle button is added in this embodiment of the present application. The volume middle button may be configured to trigger adjustment of at least two types of output volume.

For example, if the user presses the volume middle button once, decrease of the media volume and ring volume may be triggered. If the user presses the volume middle button again, restoration of the media volume and the ring volume may be triggered.

For another example, if the user long presses the volume middle button, decrease of all the volume in the mobile phone may be triggered simultaneously. If the user long presses the volume middle button again, restoration of all the volume may be triggered.

Through this solution, appearance design of an existing mobile phone may be changed. The user may set volume of the electronic device by using a button except the physical volume button, and a fault-tolerant mechanism is provided for the physical volume button. In addition, multiple commonly used volume settings for the user may be supported, so that the user can use the settings easily, and the multiple output parameters of the electronic device can be adjusted more easily.

In this embodiment of the present application, the target adjustment mode may include at least one adjustment mode, and different adjustment modes correspond to different preset inputs. For example, different inputs for the target buttons by the user will trigger different volume adjustment combinations and different adjustment ways. For example, different inputs on the volume middle button will trigger different volume adjustment results.

In this case, step 201 of FIG. 2 may be specifically implemented by step 201g or step 201h as follows.

Step 201g: In a case that a first input is a first preset input, at least two first output parameters are adjusted by the electronic device in response to the first input according to an adjustment way corresponding to the first preset input.

Step 201h: In a case that a first input is a second preset input, at least two first output parameters are adjusted in response to the first input according to an adjustment way corresponding to the second preset input.

In this embodiment of the present application, the first preset input corresponds to one way for adjusting at least two types of output volume, and the second preset input corresponds to another way for adjusting the at least two types of output volume. An adjustment way corresponding to the first input can be determined by the electronic device according to the first input by the user, and the at least two types of output volume can be adjusted according to the adjustment way.

For example, referring to Table 7, assuming that the first preset input is to press the volume middle button once, and an adjustment way corresponding to the first preset input is: numerical values of the media volume and the ring volume are controlled to decrease, and then if the user presses the volume middle button once (that is, the first input conforms to the first preset input), it can be triggered that the numerical values of the media volume and the ring volume are adjusted to decrease.

TABLE 7

| Volume type | Adjustment way | First preset input |
| --- | --- | --- |
| Media volume | Decrease | Press the volume |
| Ring volume | Decrease | middle button once |

For another example, referring to Table 8, assuming that the first preset input is to long press the volume middle button, and an adjustment way corresponding to the first preset input is: numerical values of the ring volume, the alarm volume, and the media volume are controlled to decrease, and then if the user long presses the volume middle button (that is, the first input is the first preset input), it can be triggered that the numerical values of the ring volume, the alarm volume, and the media volume are adjusted to decrease.

TABLE 8

| Volume type | Adjustment way | First preset input |
| --- | --- | --- |
| Ring volume | Decrease | Long press the volume |
| Alarm volume | Decrease | middle button |
| Media volume | Decrease | |

The parameter adjustment method according to this embodiment of the present application can help the user trigger adjustment of volume combinations of the electronic device quickly according to a scene.

In this embodiment of the present application, multiple types of volume may be adjusted by one click, so that a way for the user to adjust the multiple types of volume can be simplified, and there is no need to adjust different types of volume through multiple types of handover. Moreover, by adjusting the multiple types of volume by one click, it can be prevented, in a special scene, that only a volume is adjusted but another type of volume is forgotten.

It should be noted that, as described above, the at least two first output parameters may be any combination of at least two of parameters such as the ring volume, the media volume, the alarm volume, the call volume, the display brightness, the display font, the display font size. Except that the at least two first output parameters are at least two types of output volume, description of setting steps of the at least two first output parameters, the adjustment way, and the target button, and the steps for performing adjustment of the at least two first output parameters by one click may be specifically referred to the detailed description of the foregoing setting and performing steps in the foregoing method embodiment using the at least two first output parameters as the at least two types output volume, which will not be described herein again.

Figure 4:
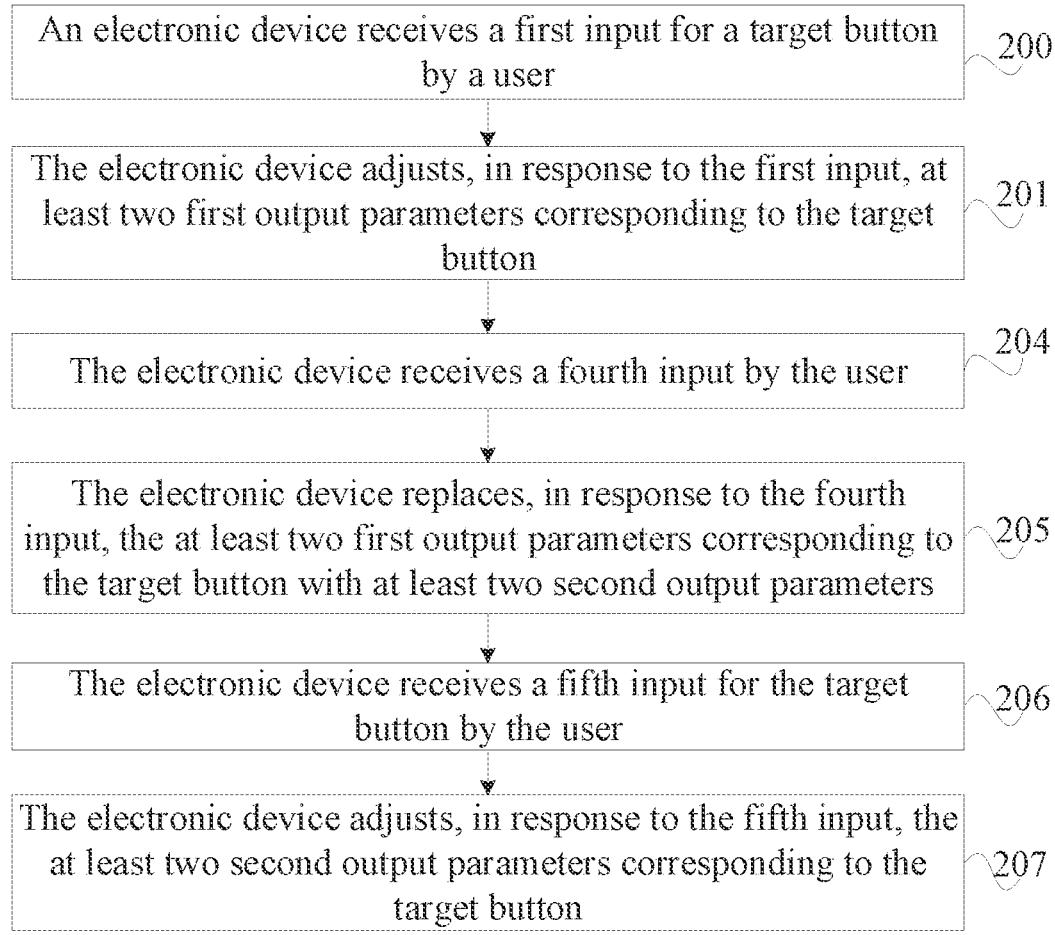
FIG. 4 is a third schematic diagram of the parameter adjustment method according to an embodiment of the present application.

In an embodiment of the present application, with reference to FIG. 2, as shown in FIG. 4, after step 201, the parameter adjustment method according to this embodiment of the present application may further include step 204 to step 207 as follows.

Step 204: The electronic device receives a fourth input by the user.

For example, the fourth input may be a parameter setting input by the user on a setting interface, or may be any other input that meets actual use requirements, which may be specifically determined according to the actual use requirements and are not limited in this embodiment of the present application.

Step 205: The electronic device replaces, in response to the fourth input, at least two first output parameters corresponding to a target button with at least two second output parameters.

The at least two second output parameters are not completely the same as the at least two first output parameters.

In this embodiment of the present application, after the electronic device adjusts the at least two first output parameters corresponding to the target button, if the user hopes to perform an input for the target button, the electronic device may be triggered to adjust output parameters (such as the foregoing at least two second output parameters) different from the at least two first output parameters, and then the user may customize parameters corresponding to the target button. Accordingly, the electronic device may replace, according to a user setting, the at least two first output corresponding to the target button with the at least two second output parameters.

Step 206: The electronic device receives a fifth input for the target button by the user.

The fifth input is the same as the first input.

Step 207: The electronic device adjusts, in response to the fifth input, at least two second output parameters corresponding to the target button.

In this embodiment of the present application, after the electronic device replaces, according to the user setting, the at least two first output parameters corresponding to the target button with the at least two second output parameters, if the user performs the first input (that is, the fifth input) for the target button again, the at least two second output parameters corresponding to the target button are adjusted by the electronic device.

Therefore, multiple output parameters corresponding to the target button may be handed over according to use requirements, and then the multiple output parameters after hand-over may be adjusted according to the actual use requirements, Therefore, through this embodiment of the present application, the multiple output parameters of the electronic device can be adjusted more easily.

Figure 5:
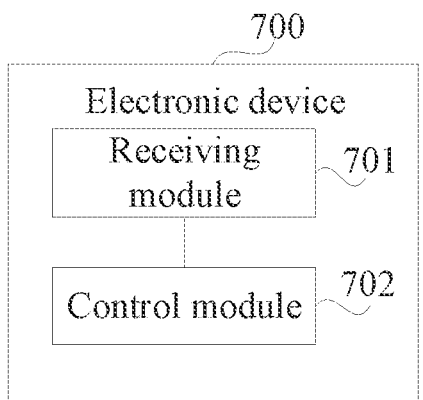
FIG. 5 is a first schematic structural diagram of an electronic device according to an embodiment of the present application.

As shown in FIG. 5, an embodiment of the present application provides an electronic device 700. The electronic device 700 may include a receiving module 701 and a control module 702. The receiving module 701 is configured to receive a first input for a target button by a user. The control module 702 is configured to adjust, in response to the first input, at least two first output parameters corresponding to the target button, and the at least two first output parameters are output parameters of the electronic device.

In this embodiment of the present application, the control module 702 is specifically configured to: control numerical values of the at least two first output parameters to increase; control numerical values of the at least two first output parameters to decrease; or control a numerical value of output parameter 1 to increase and a numerical value of output parameter 2 to decrease. Output parameter 1 is at least one of the at least two first output parameters, and output parameter 2 is an output parameter of the at least two first output parameters except output parameter 1.

In this embodiment of the present application, the control module 702 is specifically configured to adjust a numerical value of each of the at least two first output parameters from an original value to a target value. The target value is a first preset value, or the target value is a sum of the original value and a second preset value.

In this embodiment of the present application, the receiving module 701 is further configured to receive a second input for the target button by the user after the control module 702 adjusts the numerical value of each of the at least two first output parameters from the original value to the target value. The control module 702 is further configured to restore, in response to the second input received by the receiving module 701, the numerical value of each of the at least two first output parameters from the target value to the original value.

Figure 6:
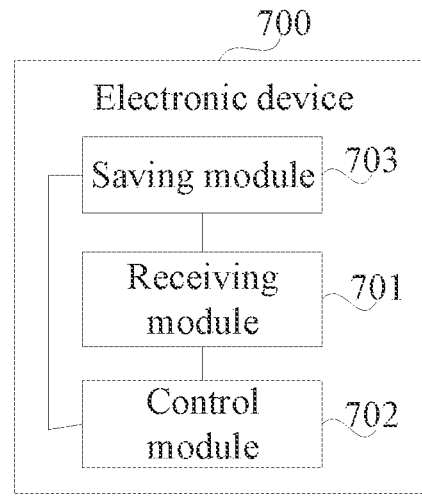
FIG. 6 is a second schematic structural diagram of an electronic device according to an embodiment of the present application.

With reference to FIG. 5, as shown in FIG. 6, the electronic device 700 according to this embodiment of the present application may further include a saving module 703. The receiving module 701 is further configured to receive a third input by the user before receiving the first input for the target button by the user. The saving module 703 is configured to save, in response to the third input, a correspondence among at least two first output parameters, a target adjustment way, and the target button.

In this embodiment of the present application, the at least two first output parameters are at least two types of output volume. A physical volume button in the electronic device may include a first button, a second button, and a third button. The first button may be configured to trigger an increase of output volume, the second button may be configured to trigger a decrease of the output volume, and the third button may be configured to trigger adjustment of the at least two types of output volume. The target button may be the third button.

In this embodiment of the present application, the target adjustment way may include at least one adjustment way, and different adjustment ways correspond to different preset inputs. In this case, the control module 702 is specifically configured to adjust, in response to the first input, the at least two first output parameters according to an adjustment way corresponding to a first preset input, in a case that the first input is the first preset input. The control module 702 is further specifically configured to adjust, in response to the first input, the at least two first output parameters according to an adjustment way corresponding to a second preset input, in a case that the first input is the second preset input.

In this embodiment of the present application, the target button may be a physical button or a virtual button.

In this embodiment of the present application, the receiving module 701 is further configured to receive a fourth input by the user after the control module 702 adjusts the at least two first output parameters corresponding to the target button. The control module 702 is further configured to replace, in response to the fourth input received by the receiving module 701, the at least two first output parameters corresponding to the target button with at least two second output parameters. The at least two second output parameters are not completely the same as the at least two first output parameters. The receiving module 701 is further configured to receive a fifth input for the target button by the user. The fifth input is the same as the first input. The control module 702 is further configured to adjust, in response to the fifth input received by the receiving module 701, the at least two second output parameters corresponding to the target button.

The electronic device provided in this embodiment of the present application can implement the processes that are implemented by the electronic device in the foregoing method embodiments. To avoid repetition, details are not described herein again.

The electronic device provided in this embodiment of the present application can receive the first input for the target button by the user; and adjust, in response to the first input, the at least two first output parameters corresponding to the target button. The at least two first output parameters are output parameters of the electronic device. Through this solution, adjustment of multiple output parameters of the electronic device can be triggered by one click, so that a way for the user to adjust the multiple output parameters can be simplified. For example, the at least two first output parameters are multiple types of output volume (for example, ring volume and media volume). In this embodiment of the present application, adjustment of multiple types of volume of the electronic device can be triggered by one click, and there is no need to adjust different types of volume through multiple times of handover, so that a way for the user to adjust the multiple types of volume can be simplified. Therefore, through this embodiment of the present application, the multiple output parameters of the electronic device can be adjusted more easily.

Figure 7:
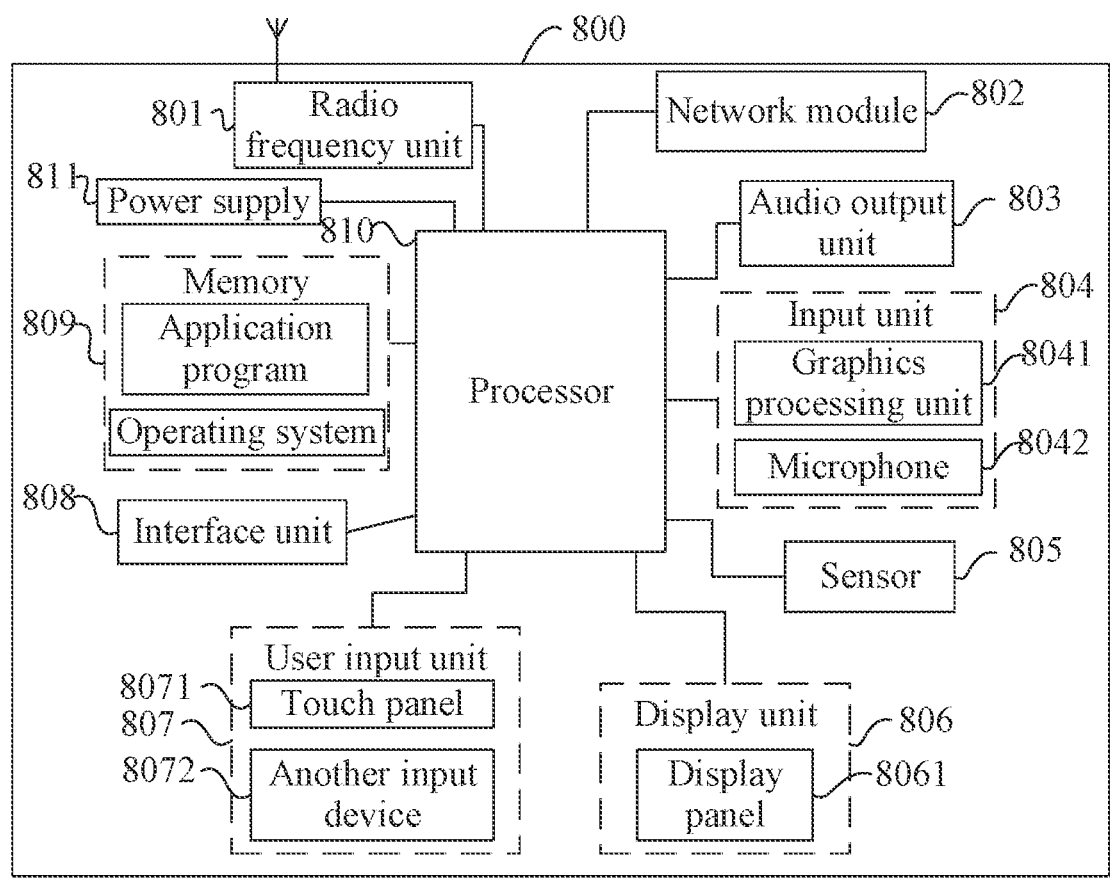
FIG. 7 is a schematic diagram of hardware of an electronic device according to an embodiment of the present application.

FIG. 7 is a schematic diagram of a hardware structure of an electronic device according to each embodiment of the present application. As shown in FIG. 7, the electronic device 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and the like. A person skilled in the art may understand that a structure of the electronic device shown in FIG. 7 constitutes no limitation on the electronic device, and the electronic device may include more or fewer components than those shown in the figure, or have a combination of some components, or have a different component arrangement. In this embodiment of the present application, the electronic device includes but is not limited to a mobile phone, a tablet computer, a notebook computer, a palmtop computer, an in-vehicle terminal, a wearable device, a pedometer, and the like.

The user input unit 807 is configured to receive a first input for a target button by a user. The processor 810 is configured to adjust, in response to the first input received by the user input unit 807, at least two first output parameters corresponding to the target button. The at least two first output parameters are output parameters of the electronic device.

This embodiment of the present application provides an electronic device. The electronic device can receive the first input for the target button by the user; and adjust, in response to the first input, the at least two first output parameters corresponding to the target button. The at least two first output parameters are output parameters of the electronic device. Through this solution, adjustment of multiple output parameters of the electronic device can be triggered by one click, so that a way for the user to adjust the multiple output parameters can be simplified. For example, the at least two first output parameters are multiple types of output volume (for example, ring volume and media volume), In this embodiment of the present application, adjustment of multiple types of volume of the electronic device can be triggered by one click, and there is no need to adjust different types of volume through multiple times of handover, so that a way for the user to adjust the multiple types of volume can be simplified. Therefore, through this embodiment of the present application, the multiple output parameters of the electronic device can be adjusted more easily.

It should be understood that in this embodiment of the present application, the radio frequency unit 801 may be configured to receive and transmit information, or receive and transmit signals during a call. Specifically, the radio frequency unit receives downlink data from a base station, and transmits the downlink data to the processor 810 for processing; and transmits uplink data to the base station. Generally, the radio frequency unit 801 includes, but is not limited to, an antenna, at least one amplifier, a transceiver, a coupler, a low noise amplifier, a duplexer, and the like. In addition, the radio frequency unit 801 may further communicate with another device by using a wireless communication system and network.

The electronic device 800 provides the user with wireless broadband Internet access through the network module 802, for example, helps the user receive and send e-mails, browse web pages, access streaming media, and the like.

The audio output unit 803 may convert audio data received by the radio frequency unit 801 or the network module 802 or stored in the memory 809 into an audio signal and output the audio signal as a sound. Moreover, the audio output unit 803 can further provide audio output (for example, a call signal received sound or a message received sound) related to a specific function performed the electronic device 800. The audio output unit 803 includes a speaker, a buzzer, a telephone receiver, and the like.

The input unit 804 is configured to receive audio or radio frequency signals. The input unit 804 may include a graphics processing unit (GPU) 8041 and a microphone 8042, and the graphics processing unit 8041 processes image data of a still picture or video obtained by an image capture apparatus (such as a camera) in a video capture way or an image capture mode. A processed image frame may be displayed on the display unit 806. The image frame processed by the graphics processing unit 8041 may be stored in the memory 809 (or another storage medium) or sent via the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The electronic device 800 further includes at least one sensor 805, for example, a light sensor, a motion sensor, and another sensor. Specifically, the light sensor includes an ambient light sensor and a proximity sensor. The ambient light sensor may adjust brightness of a display panel 8061 according to ambient light brightness. The proximity sensor may switch off the display panel 8061 and/or backlight when the electronic device 800 approaches an ear. As a motion sensor, an accelerometer sensor may detect magnitude of acceleration in various directions (usually three axes), may detect magnitude and a direction of gravity when stationary, may be configured to identify the electronic device's postures (such as handover between a landscape mode and a portrait mode, a related game, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein again.

The display unit 806 is configured to display information entered by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to receive entered number or character information, and generate a key signal input related to user settings and function control of the electronic device, Specifically, the user input unit 807 includes a touch panel 8071 and another input device 8072. The touch panel 8071, also called a touch screen, may collect a touch operation on or near the touch panel by the user (for example, an operation on the touch panel 8071 or near the touch panel 8071 by a finger or any suitable object or accessory such as a touch pen by the user). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and receives and executes a command sent by the processor 810. In addition, the touch panel 8071 may be implemented by various types such as a resistive type, a capacitive type, an infrared ray type, or a surface acoustic wave type. In addition to the touch panel 8071, the user input unit 807 may further include the another input device 8072. Specifically, the another input device 8072 may include but is not limited to: a physical keyboard, a function button (such as a volume control button, a switch button), a trackball, a mouse, and a joystick, which is not described herein.

Further, the touch panel 8071 may cover the display panel 8061. When detecting a touch operation on or near the touch panel 8071, the touch panel transmits the touch operation to the processor 810 to determine a type of a touch event. Then, the processor 810 provides a corresponding visual output on the display panel 8061 based on the type of the touch event. Although in FIG. 7, the touch panel 8071 and the display panel 8061 are configured as two independent components to implement input and output functions of the electronic device, in some embodiments, the touch panel 8071 and the display panel 8061 can be integrated to implement the input and output functions of the electronic device. Details are not limited herein.

The interface unit 808 is an interface for connecting an external apparatus and the electronic device 800. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive an input (for example, data information and power) from an external apparatus and transmit the received input to one or more elements in the electronic device 800 or may be configured to transmit data between the electronic device 800 and the external apparatus.

The memory 809 may be configured to store a software program and various pieces of data. The memory 809 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 809 may include a high-speed random access memory or a nonvolatile memory, for example, at least one disk storage device, a flash memory, or another volatile solid-state storage device.

The processor 810 is a control center of the electronic device and connects all parts of the electronic device using various interfaces and circuits. By running or executing software programs and/or modules stored in the memory 809 and by calling data stored in the memory 809, the processor implements various functions of the electronic device and processes data, thus performing overall monitoring on the electronic device. The processor 810 may include one or more processing units. The processor 810 may integrate an application processor and a modem processor. The application processor mainly deals with an operating system, a user interface, an application program, and the like. The modem processor mainly deals with wireless communication. It can be understood that the modem processor may not be integrated into the processor 810.

The electronic device 800 may further include the power supply 811 (such as a battery) supplying power to each component. The power supply 811 may be logically connected to the processor 810 by using a power management system, so as to implement functions such as charging management, discharging management, and power consumption management by using the power management system.

In addition, the electronic device 800 includes some functional modules not shown. Details are not described herein again.

An embodiment of the present application further provides an electronic device, including the processor 810 and the memory 809 that are shown in FIG. 7, and a computer program that is stored in the memory 809 and that can be run on the processor 810. When the computer program is executed by the processor 810, the processes of the foregoing embodiments of the parameter adjustment method are implemented, and a same technical effect can be achieved. To avoid repetition, details are not described herein again.

This embodiment of the present application further provides a non-transitory computer-readable storage medium. A computer program is stored in the non-transitory computer-readable storage medium. When the computer program is executed by a processor, processes of the foregoing embodiments of the parameter adjustment method can be implemented, and a same technical effect can be achieved. To avoid repetition, details are not described herein. The non-transitory computer-readable storage medium may include a read-only memory (ROM), a random access memory (RAM), a magnetic disk, an optical disc, or the like.

It should be noted that the terms "include", "comprise" or any other variants thereof herein are intended to cover a non-exclusive inclusion, so that a process, a method, an article, or an apparatus that includes a list of elements not only includes those elements, and further includes another element not expressly listed, or an element inherent to such process, method, article, or apparatus. Without more restrictions, an element defined by the statement "including a . . . " does not exclude another same element in this process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing an electronic device (which may be a mobile phone, a computer, a server, an air conditioner, a network device, or the like) to perform the method disclosed in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims of this application and the protection scope of claims, all of which fall within the protection of this application.

What is claimed is:

1. A method for parameter adjustment, performed by an electronic device, comprising:
    receiving a first input for a target button by a user, wherein the first input is a single user input that triggers adjustment of at least two first output parameters of the electronic device simultaneously, and the target button is a physical button of the electronic device;
    adjusting, in response to the first input, the at least two first output parameters corresponding to the target button;
    receiving a fourth input by the user;
    replacing, in response to the fourth input, the at least two first output parameters corresponding to the target button with at least two second output parameters, wherein the at least two second output parameters are not completely the same as the at least two first output parameters;
    receiving a fifth input for the target button by the user, wherein the fifth input is the same as the first input; and
    adjusting, in response to the fifth input, the at least two second output parameters corresponding to the target button.

2. The method according to claim 1, wherein the adjusting at least two first output parameters corresponding to the target button comprises:
    adjusting a numerical value of each of the at least two first output parameters from an original value to a target value;
    wherein the target value is a first preset value, or the target value is a sum of the original value and a second preset value.

3. The method according to claim 2, wherein after the adjusting a numerical value of each of the at least two first output parameters from an original value to a target value, the method further comprises:
    receiving a second input for the target button by the user; and
    restoring, in response to the second input, the numerical value of each of the at least two first output parameters from the target value to the original value.

4. The method according to claim 1, wherein before the receiving a first input for a target button by a user, the method further comprises:
    receiving a third input by the user; and
    saving, in response to the third input, a correspondence among the at least two first output parameters, a target adjustment way, and the target button.

5. The method according to claim 1, wherein the at least two first output parameters are at least two types of output volume, and a physical volume button in the electronic device comprises a first button, a second button, and a third button,
    wherein the first button is configured to trigger an increase of the output volume, the second button is configured to trigger a decrease of the output volume, and the third button is configured to trigger adjustment of the at least two types of output volume,
    wherein the target button is the third button.

6. The method according to claim 1, wherein the adjusting, in response to the first input, at least two first output parameters corresponding to the target button comprises:
    adjusting, in a case that the first input is a first preset input, the at least two first output parameters in response to the first input according to an adjustment way corresponding to the first preset input; and
    adjusting, in a case that the first input is a second preset input, the at least two first output parameters in response to the first input according to an adjustment way corresponding to the second preset input.

7. An electronic device, comprising: a processor, a memory, and a computer program stored in the memory and executable by the processor to perform operations comprising:
    receiving a first input for a target button by a user, wherein the first input is a single user input that triggers adjustment of at least two first output parameters of the electronic device simultaneously, and the target button is a physical button of the electronic device;
    adjusting, in response to the first input, the at least two first output parameters corresponding to the target button;
    receiving a fourth input by the user;
    replacing, in response to the fourth input, the at least two first output parameters corresponding to the target button with at least two second output parameters, wherein the at least two second output parameters are not completely the same as the at least two first output parameters;

receiving a fifth input for the target button by the user, wherein the fifth input is the same as the first input; and adjusting, in response to the fifth input, the at least two second output parameters corresponding to the target button.

8. The electronic device according to claim 7, wherein the adjusting at least two first output parameters corresponding to the target button comprises:

adjusting a numerical value of each of the at least two first output parameters from an original value to a target value;

wherein the target value is a first preset value, or the target value is a sum of the original value and a second preset value.

9. The electronic device according to claim 8, wherein after the adjusting a numerical value of each of the at least two first output parameters from an original value to a target value, the method further comprises:

receiving a second input for the target button by the user; and restoring, in response to the second input, the numerical value of each of the at least two first output parameters from the target value to the original value.

10. The electronic device according to claim 7, wherein before the receiving a first input for a target button by a user, the method further comprises:

receiving a third input by the user; and saving, in response to the third input, a correspondence among the at least two first output parameters, a target adjustment way, and the target button.

11. The electronic device according to claim 7, wherein the at least two first output parameters are at least two types of output volume, and a physical volume button in the electronic device comprises a first button, a second button, and a third button, wherein the first button is configured to trigger an increase of the output volume, the second button is configured to trigger a decrease of the output volume, and the third button is configured to trigger adjustment of the at least two types of output volume, wherein the target button is the third button.

12. The electronic device according to claim 7, wherein the adjusting, in response to the first input, at least two first output parameters corresponding to the target button comprises:

adjusting, in a case that the first input is a first preset input, the at least two first output parameters in response to the first input according to an adjustment way corresponding to the first preset input; and adjusting, in a case that the first input is a second preset input, the at least two first output parameters in response to the first input according to an adjustment way corresponding to the second preset input.

13. A non-transitory computer-readable storage medium, storing a computer program, when the computer program is executed by a processor, performs a method for parameter adjustment, the method comprising:

receiving a first input for a target button by a user, wherein the first input is a single user input that triggers adjustment of at least two first output parameters of the electronic device simultaneously, and the target button is a physical button of the electronic device;

adjusting, in response to the first input, the at least two first output parameters corresponding to the target button;

receiving a fourth input by the user;

replacing, in response to the fourth input, the at least two first output parameters corresponding to the target button with at least two second output parameters, wherein the at least two second output parameters are not completely the same as the at least two first output parameters;

receiving a fifth input for the target button by the user, wherein the fifth input is the same as the first input; and adjusting, in response to the fifth input, the at least two second output parameters corresponding to the target button.

14. The non-transitory computer-readable storage medium according to claim 13, wherein the adjusting at least two first output parameters corresponding to the target button comprises:

adjusting a numerical value of each of the at least two first output parameters from an original value to a target value;

wherein the target value is a first preset value, or the target value is a sum of the original value and a second preset value.

15. The non-transitory computer-readable storage medium according to claim 14, wherein after the adjusting a numerical value of each of the at least two first output parameters from an original value to a target value, the method further comprises:

receiving a second input for the target button by the user; and restoring, in response to the second input, the numerical value of each of the at least two first output parameters from the target value to the original value.

16. The non-transitory computer-readable storage medium according to claim 15, wherein before the receiving a first input for a target button by a user, the method further comprises:

receiving a third input by the user; and saving, in response to the third input, a correspondence among the at least two first output parameters, a target adjustment way, and the target button.

17. The non-transitory computer-readable storage medium according to claim 15, wherein the at least two first output parameters are at least two types of output volume, and a physical volume button in the electronic device comprises a first button, a second button, and a third button, wherein the first button is configured to trigger an increase of the output volume, the second button is configured to trigger a decrease of the output volume, and the third button is configured to trigger adjustment of the at least two types of output volume, wherein the target button is the third button.

18. The non-transitory computer-readable storage medium according to claim 15, wherein the adjusting, in response to the first input, at least two first output parameters corresponding to the target button comprises:

adjusting, in a case that the first input is a first preset input, the at least two first output parameters in response to the first input according to an adjustment way corresponding to the first preset input; and adjusting, in a case that the first input is a second preset input, the at least two first output parameters in response to the first input according to an adjustment way corresponding to the second preset input.

* * * * *